United States Patent [19]

Fujii et al.

[11] Patent Number: 4,910,262
[45] Date of Patent: Mar. 20, 1990

[54] OLEFINIC BLOCK COPOLYMERS CONTAINING THREE BLOCKS

[75] Inventors: Masaki Fujii; Shiroh Gotoh, both of Yokkaichi; Masahiro Gotoh, Suzuka; all of Japan

[73] Assignee: Mitsubishi Petrochemical Company Limited, Tokyo, Japan

[21] Appl. No.: 302,106

[22] Filed: Jan. 25, 1989

Related U.S. Application Data

[63] Continuation of Ser. No. 37,086, Apr. 10, 1987, abandoned, which is a continuation of Ser. No. 787,144, Oct. 15, 1985, abandoned.

[30] Foreign Application Priority Data

Oct. 15, 1984 [JP] Japan ................... 59-215729

[51] Int. Cl.$^4$ ........................................... C08F 297/08
[52] U.S. Cl. ...................................... 525/323; 525/268
[58] Field of Search .................................... 525/323

[56] References Cited

U.S. PATENT DOCUMENTS

| | | | |
|---|---|---|---|
| 3,670,053 | 6/1972 | Sennari et al. | 525/323 |
| 4,254,237 | 3/1981 | Shiga et al. | 525/323 |

FOREIGN PATENT DOCUMENTS

| | | | |
|---|---|---|---|
| 0029651 | 6/1981 | European Pat. Off. | |
| 0103486 | 8/1979 | Japan | 525/323 |
| 0162621 | 9/1983 | Japan | 525/323 |

*Primary Examiner*—Wilbert J. Briggs, Sr.
*Attorney, Agent, or Firm*—Oblon, Spivak, McClelland, Maier & Neustadt

[57] ABSTRACT

A novel block copolymer consisting essentially of ethylene and propylene and comprising 1 to 20 parts by weight of block (A) having an ethylene content of 0 to 4% by weight, 5 to 49 parts by weight of block (B) having an ethylene content of more than 4% and less than 25% by weight, and 50 to 94 parts by weight of block (C) having an ethylene content of 25 to 85% by weight. The block copolymer is characterized by less formation of flow marks in molding, and also has excellent tensile characteristics.

2 Claims, No Drawings

OLEFINIC BLOCK COPOLYMERS CONTAINING THREE BLOCKS

This application is a continuation of application Ser. No. 037,086 filed on Apr. 10, 1987 now abandoned, which is a continuation of Ser. No. 787,144, filed on Oct. 15, 1985 now abandoned.

BACKGROUND OF THE INVENTION

This invention relates to an olefinic block copolymer which has good strength and resistance to heat and low-temperature impact as well as excellent appearance and processability.

In recent years, flexible resin materials having excellent strength and resistance to heat and impact (especially at low temperature) have been demanded for the parts or materials to be used in automobiles, exteriors, household electric appliances, electric cables, pipes, sheets, etc. Conventional soft polymeric materials include plasticized polyvinyl chloride, ethylene-vinyl acetate copolymer, vulcanized rubber, etc. They generally have excellent impact resistance at low temperature but have poor resistance to heat or to cold temperature. Thus, their uses have been restricted. A random copolymer of propylene and other olefins normally has good thermal resistance, but is somewhat deficient in flexibility, and has poor impact resistance at low temperature, in comparison with the above mentioned polymeric materials. The resin material which somewhat satisfies the above mentioned properties simultaneously can be obtained, for example, by mechanically blending polypropylene and ethylene-propylene rubber or the like. Such blended resin materials, however, are not attractive because of cost increase in such blending steps.

The term "flexible resin materials" according to the present invention means the materials having Olsen flexural rigidity (10-degree angle) of not more than 1,500 kg/sq.cm and strictly not more than 1,000 kg/sq.cm, or JIS-A hardness of not more than 97 and strictly not more than 95.

Instead of mechanically blending polypropylene and ethylene-propylene rubber, it has been proposed to polymerize them in a polymerization reactor according to two-step polymerization method. The resulting block copolymer is advantageous in costs in comparison with the above mentioned mechanically blended product, and also has the physical properties of such blended materials.

As far as we know, block copolymers comprising propylene and ethylene and satisfying the flexibility sought in the present invention are disclosed in Japanese Patent Laid-Open Publication Nos. 80418/80, 10611/82 and 10612/82. These block copolymers are composed of two blocks. The results of our experiments, however, indicate that molded articles of these block copolymers have low commercial values because flow marks (i.e. streaks periodically appearing perpendicularly to the direction of resin flow) are formed on the surfaces thereof when the copolymers are injection-molded, and these articles are also markedly whitened at deformed portions when subjected to impact or deformation. Extruded articles of these block copolymers also have poor properties because the tensile strength thereof at fracture is markedly low at high temperatures, although tensile characteristics at room temperature are fairly good.

SUMMARY OF THE INVENTION

We have conducted intensive research to solve the above described problems without impairing the flexibility of polymers which is one the characteristics of the prior art polymers (as shown in Japanese Patent Laid-Open Publication No.80418/1980, etc.), and as a result we have found that a block copolymer obtained by combining in specific proportions copolymers blocks (A), (B) and (C) having specific compositions has, in addition to the characteristics possessed by a known two-step block copolymer, an excellent external appearance and tensile characteristics. The present invention is based on this and related findings.

The olefinic block copolymer according to the present invention is characterized by being defined by the following specifications (1) and (2):

(1) MFR [ASTM-D-1238(L)] of the block copolymer is 0.01 to 200 [g/10 minutes], and (2) the block copolymer comprises (i) 1 to 20 parts by weight of a polymer block (A) selected from a propylene homopolymer block and a propylene/ethylene random copolymer block, having an ethylene content of 0 to 4% by weight, (ii) 5 to 49 parts by weight of a propylene/ethylene random copolymer block (B) having an ethylene content of more than 4% and less than 25% by weight, and (iii) 50 to 94 parts by weight of a propylene/ethylene random copolymer block (C) having an ethylene content of 25 to 85% by weight.

Throughout this disclosure, quantities expressed in percentages and parts are by weight unless otherwise designated.

DETAILED DESCRIPTION OF THE INVENTION

Block Copolymer

(1) Composition

The block copolymer according to the present invention comprises (i) 1 to 20 parts of a polymer block (A) selected from a propylene homopolymer block and a propylene/ethylene random copolymer block, having an ethylene content of 0 to 4%, (ii) 5 to 49 parts of a propylene/ethylene random copolymer block (B) having an ethylene content of more than 4% and less than 25%, and (iii) 50 to 94 parts of a propylene/ethylene random copolymer block (C) having an ethylene content of 25 to 85%.

The block copolymer of this invention comprises only one or more than one of the polymer blocks (A), (B) and (C). The arrangement of the polymer blocks is not restricted. Ordinarily, however, the polymer blocks are arranged in the sequence of (A)-(B)-(C).

Such a block copolymer according to the present invention will be a "theoretical" or "ideal" block copolymer wherein the blocks (A), (B) and (C) are comprised in a single polymer molecule chain, a physical mixture of molecular chains of these blocks, or a mixture thereof. The term "block copolymer" should herein be construed in this way.

The contents of polymer blocks in the present block polymer are shown in the following Table.

| Blocks | Content (parts) | | |
|---|---|---|---|
| | general | preferable | more preferable |
| (A) | 1-20 | 3-17 | 5-15 |

| Blocks | Content (parts) | | |
|---|---|---|---|
| | general | preferable | more preferable |
| (B) | 5-49 | 7-42 | 10-35 |
| (C) | 50-94 | 55-90 | 60-85 |

The block (A) is a highly crystalline component, which imparts strength and thermal resistance to the resulting block copolymer. These properties are impaired when the content thereof is less than the above stated range. When the content of block (A) is greater than the range, the characteristics of physical properties attributable to the blocks (B) and (C) are impaired.

The block (B) has a composition intermediate between those of blocks (A) and (C) and contributes to the increase in compatibility of these two blocks. More specifically, in the case of a two-step block copolymer (A)-(C), the morphology of the block copolymer becomes markedly nonuniform and results in poor appearance (flow marks, whitening) of molded articles, because of poor compatibility of the blocks (A) and (C). A three-step block copolymer (A)-(B)-(C) provides molded article of excellent appearance and exhibits good properties, presumably because of high uniformity in morphology. Thus, poor appearance takes place when the content of the block (B) is less than the above stated range. The characteristics of physical properties caused by the blocks (A) and (C) are impaired when the content is more than the range.

The block (C) is an amorphous or low crystalline, cold-resistant component, which imparts flexibility and low-temperature impact resistance to the resulting block polymer. These properties are impaired when the content of the block (C) is less than the above stated range. The characteristics of the physical properties due to the blocks (A) and (B) are impaired when the content thereof is more than the range.

The block (A) is a homopolymer of propylene or a random bipolymer of propylene and ethylene. The monomer composition thereof is shown in the following table.

| | general | preferable | more preferable |
|---|---|---|---|
| ethylene content (% by weight) | 0 to 4 | 0 to 3 | 0 to 2 |

When the thermal resistance of the block copolymer is more important, a lower content of ethylene is employed within the above stated range. When the flexibility is more important, a higher content of ethylene can be used within the range. The thermal resistance and strength cannot be obtained when the ethylene content is more than the above range.

The block (B) is a random bipolymer of ethylene and propylene. The monomer composition thereof is shown in the following table.

| | general | preferable | more preferable |
|---|---|---|---|
| ethylene content (% by wt.) | more than 4 and less than 25 | 5 to 20 | 6 to 18 |

The block (B) has the function of enhancing the compatibility between blocks (A) and (C), which is considered to result in improvement in the external appearance of molded articles as well as the tensile characteristics. The external appearance is impaired when the composition is outside of the above mentioned range.

The block (C) is a random bipolymer of propylene and ethylene. The monomer composition is shown in the following table.

| | general | preferable | more preferable |
|---|---|---|---|
| ethylene content (% by wt.) | 25 to 85 | 25 to 70 | 30 to 60 |

The block (C) is a component for imparting flexibility and resistance to low temperature. When the ethylene content is less than the above stated range, the flexibility and low-temperature impact resistance are impaired because of increase in chains of isotactic polypropylene. When the ethylene content is more than the above range, the low-temperature impact resistance can be maintained, but the flexibility is impaired because of increase in chains of polyethylene. (2) Molecular Weight The molecular weight of the present block copolymer is required to fall within a range such that MFR [ASTM-D-1238(L)] is 0.01 to 200 [g/10 minutes]. When the MFR is higher than this range, the resulting block copolymer fails to reach a practical level of mechanical strength or cannot be molded because the molecular weight is too low. When the MFR is lower than the above stated range, viscoelasticity of the block copolymer in a molten state becomes poor, and the copolymer cannot be molded because the molecular weight is too high. Especially when the copolymer is molded at a relatively high shearing velocity as in injection molding, it is preferable that the MFR be within the range of more than 0.2 and not more than 200 because of the problems of external appearance such as flow marks and the economical reasons such as shorter molding cycles.

Production of Block Copolymer

The present block copolymer can be produced in the presence of a stereospecific polymerization catalyst by the combination of the following steps:

(a) a step of forming 1 to 20 parts, preferably 3 to 17 parts, more preferably 5 to 20 parts, of a propylene homopolymer block or random copolymer block consisting essentially of propylene and ethylene, wherein ethylene content is 0 to 4% (preferably 0 to 3%, more preferably 0 to 2%), (b) a step of forming 5 to 49 parts, preferably 7 to 42 parts, more preferably 10 to 35 parts, of a random copolymer block consisting essentially of propylene and ethylene, wherein ethylene content is more than 4% and less than 25%, preferably 6 to 20%, more preferably 7 to 18%, and (c) a step of forming 50 to 94 parts, preferably 55 to 90 parts, more preferably 60 to 85 parts, of a random copolymer block consisting essentially of propylene and ethylene, wherein ethylene content is 25 to 85%, preferably 25 to 70%, more preferably 30 to 60%.

The definition of the block copolymer of the present invention as given hereinbefore is to cover the state of the blocks (A), (B) and (C) in the block copolymer which will be produced in the way of forming the blocks (A), (B) and (C) described above.

The sequential order of the steps (a), (b) and (c) is not restricted. Ordinarily, the steps are carried out in the sequence of (a)-(b)-(c). Any step of the above described steps can be divided into two or more sub-steps, and thus a polymer block having a different composition can be prepared in each of the sub-steps.

An example of a suitable stereospecific polymerization catalyst for use in the present invention is a catalyst comprising a titanium component and an organoaluminum compound. As the titanium component, a titanium trichloride of $\alpha$, $\beta$, $\gamma$ or $\delta$ type, a titanium compound supported by a carrier such as magnesium chloride, etc., can be used.

In this connection, a suitable titanium component of the catalyst is a specific titanium trichloride preparation which has been prepared by reducing titanium tetrachloride with an organoaluminum compound to obtain a titanium trichloride mixture (the main components are considered to be a eutectic crystal mixture of titanium trichloride and aluminum chloride), removing the aluminum chloride by extraction with a complexing agent from the titanium trichloride mixture, and activating the resulting titanium trichloride by suitable treatment. Use of such a titanium trichloride can produce a more rubber-like block (B) in comparison with that obtained by the use of other titanium trichlorides.

When a high yield per catalyst of the block copolymer is desired, it is preferred to use titanium trichloride or tetrachloride carried by magnesium chloride or the like.

For the organoaluminum compound, it is preferable to use a compound represented by the general formula $AlR_aY_{3-a'}$ wherein: "a" is an optional number of $0 < a \leq 3$; Y is a halogen atom; and R is a hydrocarbon residue having 1 to about 18 carbon atoms, preferably an alkyl group and/or an aryl group. Preferable examples of the compound include triethyl aluminum, and diethylaluminum chloride.

With the catalyst comprising these two essential components may be combined a small quantity of an electron donor as a third component. For this electron donor, organic acid esters, ethers, amines, alcohols, ketones, aldehydes, phenols, etc. can be used.

Polymerization can be carried out in a continuous or batch-wise system. In the continuous process, one or more polymerization vessels are used for each of the above described steps (a), (b) and (c). Reactions are carried out in each reaction vessel under steady conditions. The batch-wise process is carried out by competing reaction of all or a predetermined amount of charged monomer(s) in a step followed by the next step, or by reacting a predetermined amount of monomer(s) and removing all or some unreacted monomer(s) which step is followed by the next step.

The polymerization is normally conducted at a temperature of 0° to 200° C. and under pressure of 0 to 100 kg/sq.cm (gauge pressure). The polymerization pressure is allowed to be lower than 0 kg/sq.cm (gauge pressure). Hydrogen can be used to control the molecular weight of the resulting copolymer. The concentration of hydrogen can be varied in each step to change the molecular weights of the resulting copolymer blocks.

EXAMPLES

The test methods for evaluation of the products in the following examples and comparative examples are shown below.

(1) MFR (230° C., 2.16 kg) [g/10 minute] ASTM-D-1238 (L)
(2) Hardness [—] JIS K6301 A type
(3) Tensile strength at fracture [kg/sq.cm] and Tensile elongation at fracture [%] according to JIS K6301
(4) Charpy impact strength [kg-cm/sq.cm] JIS-K-7111 (test piece = 2 mm thick pressed sheet, 3-plied, with notch, measured at −40° C.)
(5) External appearance of injection-molded articles (flow mark, weld mark)
 (i) Molding machine and molding conditions:
  Type: 16 ounce in-line screw type
  Conditions:
   injection pressure 500 to 1,000 kg/sq.cm
   injection temperature 200 to 230° C.
   temperature of molds 40° C.
 (ii) Visual evaluation of flow marks and weld marks
  Evaluation standard
  O = good (substantially no uneven luster)
  Δ = not good (slight uneven luster)
  x = bad (distinct uneven luster)
(6) Whitening
 A pressed sheet 10cm × 2cm × 2cm (thickness) is folded, and whitening at the bent line is observed.
 Evaluation standard
 O = no whitening
 Δ = slightly whitened
 x = fully whitened

EXAMPLE 1

The atmosphere in a 200-liter stainless-steel reactor equipped with a stirring vane was fully replaced with propylene gas, and then the reactor was charged with 80 liters of heptane used as a polymerization solvent. The reactor was kept at 55° C., and charged with 20 g of diethylaluminum chloride (DEAC) and 6.2 g of titanium trichloride (supplied by Marubeni Solvay Kagaku K.K., Japan). Propylene and hydrogen were introduced into the reactor at a rate of 4.3 kg/hr and a concentration of 1.3% by volume, respectively, while the temperature in the reactor was raised to 60° C. When the amount of propylene supplied reached 2.2 kgs., the introduction of propylene and hydrogen was stopped. The gas remaining in the reactor was purged until the gauge pressure in the reactor decreased to 0.4 kg/sq.cm (hereinafter pressure is expressed as guage pressure). (The above described step is for block A)

Propylene and ethylene were introduced into the reactor at rates of 4.3 kg/hr and 0.26 kg/hr, respectively, and the concentration of hydrogen was controlled at 1.3% by volume. After 1.0 hour, introduction of propylene, ethylene and hydrogen was stopped. The gas remaining in the reactor was purged until the pressure therein decreased to 0.4 kg/sq.cm (Step for block B).

Then, propylene and ethylene were introduced at rates of 2.2 kg/hr and 1.1 kg/hr for 3.6 hours, respectively, while the concentration of hydrogen was controlled at 3% by volume (Step for block C).

To the slurry of the block copolymer thus obtained was added 1.1 liters of butanol. The mixture was treated at 60° C. for 3 hours and then fully contacted with water. The catalyst residue was removed by separating the aqueous phase of the mixture. The slurry was subjected to steam stripping and then drying to obtain the objective copolymer.

The properties of the resulting block copolymer as well as the ratios and compositions of the blocks constituting the block copolymer are shown in Table 1.

EXAMPLE 2

The steps in Example 1 were carried out to obtain a copolymer except that: (i) the amount of propylene supplied was changed to 1.2 kgs, and the concentration of hydrogen was changed to 2.0% by volume in the step for block (A); (ii) the rate of introducing ethylene was changed to 0.19 kg/hr, the concentration of hydrogen to 2.0% by volume, and the period of supplying monomers and hydrogen to 1.5 hours in the step for block (B); and (iii) the period of supplying monomers was changed to 2.6 hours and the concentration of hydrogen to 8% by volume in step for block (C). The results are shown in Table 1.

EXAMPLE 3

The reactor as used in Example 1 was charged with 80 liters of heptane used as a polymerization solvent. The reactor was kept at 55° C. and charged with 26g of DEAC and 4.4 g of titanium trichloride. Propylene and hydrogen were then introduced into the reactor at a rate of 2.5 kg/hr and a concentration of 1.4% by volume, respectively, and the temperature in the reactor was raised to 60° C. Ethylene was introduced at a rate of 0.28 kg/hr, 0.5 hour after starting the introduction of propylene. When the amount of propylene thus supplied reached 2.0 kgs, the introduction of propylene, hydrogen and ethylene was stopped and the reaction was continued until pressure within the reactor decreased to 2.0 kg/sq.cm. The gas remaining in the reactor was then purged until the pressure in the reactor decreased to 0.2 kg/sq.cm (Steps for block A and block B).

Then the reactor was kept at 60° C., and propylene and hydrogen were introduced thereto at rates of 0.90 kg/hr and 0.84 kg/hr, respectively, for 3.5 hours, while the concentration of hydrogen was controlled at 20% by volume (Step for block C).

Then the treatment of slurry in Example 1 was repeated to obtain the desired copolymer. The results are shown in Table 1.

COMPARATIVE EXAMPLE 1

The steps in Example 1 were carried out to obtain a copolymer except that (1) in the step for block A, the amount of propylene supplied was changed to 5.9 kgs, and ethylene was introduced at a rate of 0.22 kg/hr together with propylene until the supply of the propylene was stopped, and (ii) block B was not produced. The results are shown in Table 1.

TABLE 1

| | | Example 1 | Example 2 | Example 3 | Comparative Example 1 |
|---|---|---|---|---|---|
| Block A | Content (wt %) | 14 | 7 | 15 | 36 |
| | MFR (g/10 min.) | 0.28 | 0.83 | 0.30 | 0.36 |
| | Ethylene content (wt %) | 0 | 0 | 0 | 5.3 |
| Block B | Content (wt %) | 21 | 33 | 10 | |
| | Ethylene content (wt %) | 9 | 7 | 11 | |
| Block C | Content (wt %) | 65 | 60 | 75 | 64 |
| | Ethylene content (wt %) | 35 | 35 | 57 | 35 |
| Final block copolymer | MFR (g/10 min.) | 0.13 | 0.55 | 0.41 | 0.15 |
| | Hardness A (—) | 80 | 84 | 75 | 81 |
| | Charpy impact strength [−40° C.] $\left(\frac{kg - cm}{cm^2}\right)$ | N.B. (no breaking) | N.B. | N.B. | N.B. |
| | Tensile strength at fracture [20° C.] (kg/cm²) | 110 | 135 | 100 | 110 |
| | [60° C.] (kg/cm²) | 60 | 75 | 50 | 25 |
| | Tensile elongation at fracture [20° C.] (%) | 690 | 720 | 540 | 650 |
| | Whitening | O | O | O | x |
| | Flow mark | O | O | O | x |
| | Weld mark | O | O | O | x |

EXAMPLE 4

The steps of Example 3 were carried out to obtain a copolymer except that (i) the amount of propylene supplied was changed to 1.15 kgs, the concentration of hydrogen to 2.0% by volume, and the rate of introducing ethylene to 0.61 kg/hr, (ii) the introduction of ethylene was started 15 minutes after starting the introduction of propylene in the steps for block A and block B, and (iii) the rate of introducing propylene was changed to 0.98 kg/hr and the concentration of hydrogen to 7% by volume in the step for block C. The results are shown in Table 2.

EXAMPLE 5

The steps of Example 3 were carried out to obtain a copolymer except that (i) the rate of introducing ethylene was changed to 0.25 kg/hr and introduction of ethylene was started 20 minutes after starting the introduction of propylene in the steps for block A and block B, (ii) the rates of introducing propylene and ethylene were changed to 1.20 kg/hr and 0.65 kg/hr, respectively, the period of supplying monomers to 3.0 hours, and the concentration of hydrogen to 6% by volume in the step for block C. The results are shown in Table 2.

COMPARATIVE EXAMPLE 2

The steps of Example 4 were carried out to obtain a copolymer except that (i) ethylene was not supplied and the concentration of hydrogen was changed to 2.9% by volume in the steps for block A and block B, and (ii) the concentration of hydrogen was changed to 11% by volume in the step for block C. The results are shown in Table 2.

TABLE 2

| | | Example 4 | Example 5 | Comparative Example 2 |
|---|---|---|---|---|
| Block A | Content (wt %) | 7 | 6 | 18 |
| | MFR (g/10 min.) | 0.82 | 0.31 | 3.7 |
| | Ethylene content (wt %) | 0 | 0 | 0 |
| Block B | Content (wt %) | 11 | 25 | — |
| | Ethylene content (wt %) | 15 | 7 | — |
| Block C | Content (wt %) | 82 | 69 | 82 |
| | Ethylene content (wt %) | 54 | 40 | 54 |
| Final block copolymer | MFR (g/10 min.) | 0.14 | 0.17 | 0.33 |
| | Hardness A (—) | 66 | 78 | 82 |
| | Charpy impact strength [−40° C.] $\left(\frac{kg - cm}{cm^2}\right)$ | N.B. | N.B. | N.B. |
| | Tensile strength at fracture [20° C.] (kg/cm$^2$) | 80 | 110 | 70 |
| | [60° C.] (kg/cm$^2$) | 40 | 60 | 30 |
| | Tensile elongation at fracture [20° C.] (%) | 690 | 680 | 210 |
| | Whitening | O | O | x |
| | Flow mark | O | O | x |
| | Weld mark | O | O | x |

What is claimed is:

1. An olefinic block copolymer having an MFR of 0.01 to 200, an Olsen flexural rigidity at an angle of 10° of not more than 1500 kg/cm$^2$, a tensile strength at 20° C. of at least 80 kg/cm$^2$, a tensile strength at 60° C. of at least 40 kg/cm$^2$ and a tensile elongation at 20° C. of at least 540%, comprising:

(i) from 3 to 17 parts by weight of a polymer block (A) which is a propylene homopolymer block (A) of a propylene/ethylene random copolymer block having an ethylene content of 0 to 2% by weight;

(ii) from 10 to 35 parts by weight of a propylene-/ethylene random copolymer block (B) having an ethylene content of 6 to 18% by weight; and (iii) from 55 to 90 parts by weight of a propylene-/ethylene random copolymer block (C) having an ethylene content of 30 to 60% by weight.

2. The block copolymer of claim 1, which comprises from 5 to 15 parts by weight of block polymer (A), from 10 to 35 parts by weight of block polymer (B) and from 60 to 85 parts by weight of block copolymer (C).

* * * * *